Patented May 8, 1951

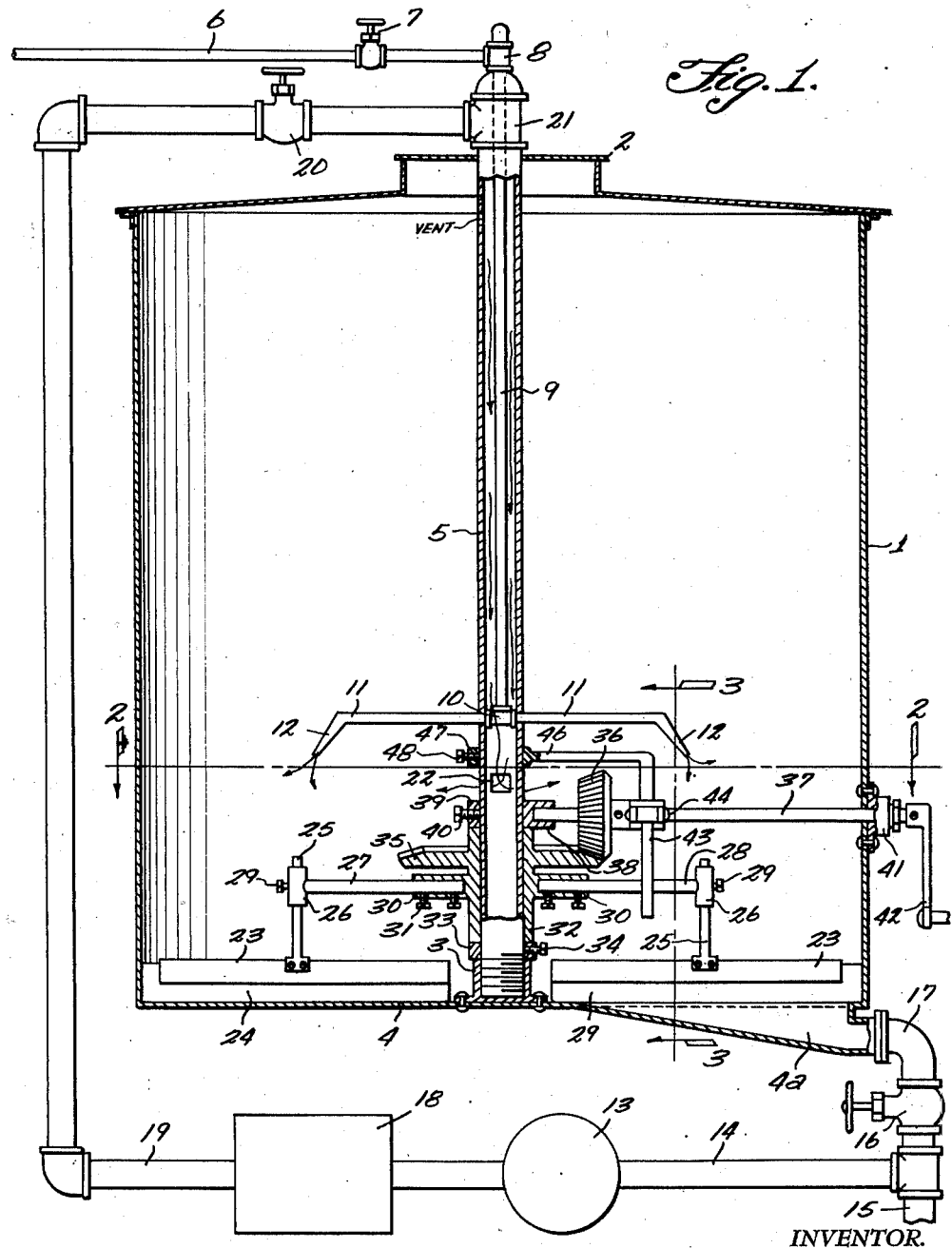

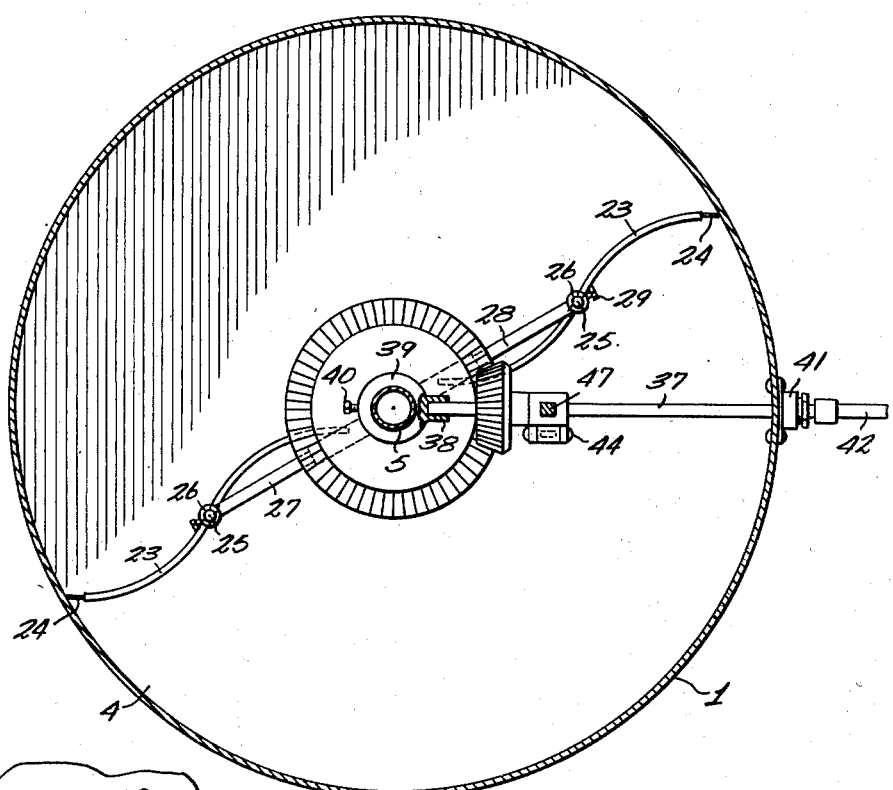
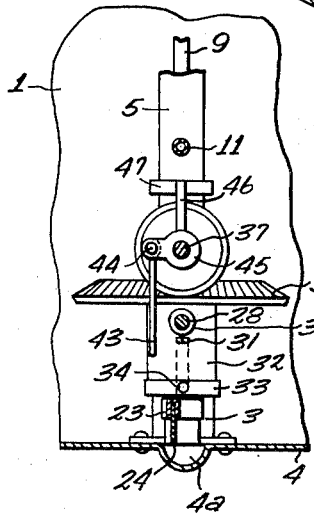
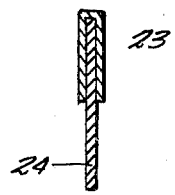

2,552,452

UNITED STATES PATENT OFFICE 2,552,452

TANK CLEANER AND OIL TREATER

Willis W. Phillips, Kermit, Tex.

Application August 26, 1948, Serial No. 46,321

3 Claims. (Cl. 259—10)

The present invention relates to the class of brushing and scrubbing machines of the manually operated rotary or revolving type for cleansing receptacles, and more specifically to a tank cleaner and oil treater which while adapted for use in storage and other tanks, is especially designed for use in field tanks holding the daily productions from oil wells; and from these tanks, after gauging, the product is sold to the pipe-line companies for refining.

Under existing conditions sediment collects in the bottom of the tank, building up a false or bad bottom that prevents accurate gauging of the contents of the tank; and the sediment must be removed by manual labor under unsanitary conditions that are dangerous to health and life. The primary purpose of the invention is the elimination of these dangerous conditions by equipping the tank with the cleansing and treating appliance of my invention, and employing the equipment at intervals for separating liquids, solids and semi-solids from the oil content of the tank, and collecting and discharging such materials from the tank.

By thus disposing of collected materials at required intervals, the excessive accumulation of material on the bottom of the tank is prevented, time and labor are saved in proper maintenance of the tank, and the efficiency of the tank is enhanced. The cleaner, manually operated from the exterior of the tank is revolved, while the oil is being treated, for collecting and discharging water, sand, lime, shale and other heavy particles; and in the earlier treating of the oil sediments such as paraffin, which breaks down when subjected to heat, is withdrawn from the tank, heated, and then returned to the tank of oil in suspension.

The appliance of my invention includes a minimum number of parts that may with facility and low cost of production be manufactured, and assembled with convenience for installation in the tank, to assure a manually operated device that is simple in construction, and durable.

The invention consists in certain novel features of construction and combinations and arrangements of parts as will hereinafter be described and more particularly set forth in the appended claims. In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claims, without departing from the principles of the invention.

Figure 1 is a vertical sectional view of a tank, with some of the operating parts in section, showing an embodiment of my invention.

Figure 2 is a horizontal sectional view at line 2—2 of Fig. 1.

Figure 3 is a detail vertical sectional view at line 3—3 of Fig. 1; and

Figure 4 is a transverse sectional detail view of one of the brushes, scrapers, or scrubbers.

In order that the general arrangement and utility of parts may readily be understood I have shown a typical cylindrical oil tank 1 having a central closure or hatch 2 in the dome shaped top of the tank. The bottom of the tank is equipped with a central upright base bushing 3 that is riveted or bolted to the bottom 4 of the tank, and one section of the bottom is fashioned with a radially extending and declining trough 4a for discharge of collected sediment from the tank.

As a support for the tank, and for supporting the interior operating parts of the cleaner, a central upright tubular column 5 is threaded into the base or bushing 3 with its upper end projecting above the top of the tank, and a gas supply pipe 6 for pre-heated gas, is provided with a control valve 7 and connected at joint 8 with a feed pipe 9 that passes down through the tubular post or column to a desired distance. For distributing the pre-heated gas within the tank a coupling 10 is jointed to the bottom of the feed pipe 9 and two diametrically arranged radial pipes 11 are provided with end nozzles 12, which direct the inflowing gas into the oil content being treated.

In the treatment of the oil, a circulating system is employed that includes the tubular column or post 5, an exterior pump 13 indicated in the drawing and having an intake pipe 14 connected to an outlet or drain pipe 15 provided with a valve 16 and connected by elbow 17 to the outer and lower end of the declining trough 4a of the bottom of the tank. From the pump the oil is passed to heating coils in a suitable heater designated at 18, and the return pipe 19 extends upwardly at the exterior of the tank and over its top where it is provided with a control valve 20 and communicates with the tubular post or column by means of an exterior coupling 21.

The pump, operated by a suitable motor, thus withdraws oil from the discharge trough, circulates the oil through the heater and returns the oil through the tubular post and an outlet port 22 of the post to the interior of the tank. The flow of oil down through the column, and around the heated gas-pipe 9 from which it receives additional heat, is thus directed through the outlet port 22 toward the bottom of the tank, and the cleaner is located beneath the port 22 to cooperate with the heated fluid as it is being treated.

As here shown the revolvable or rotatable cleaner is manually operated from the exterior of the tank, and it is designed to be operated, clockwise, for collecting and discharging the sediment to the discharge trough; and also to be reversed or turned counterclockwise for restoration to operative position for a subsequent working operation.

Two diametrically arranged and radially extending brushes or flexible scrapers, each disposed on compound curves, of S-shape, are employed, which as they turn clockwise sweep the sediment from the central portion of the tank-bottom toward the cylindrical walls of the tank, and then guide and discharge the collected sediment into the open top of the discharge or outlet trough 4a.

Each flexible scraper or brush includes an inverted U-shaped blade 23 in which the brushing or scraping elements 24 are secured; and each horizontally disposed scraper or brush is equipped with a central upright post 25, the upper end of which is adjustable and fixed in a bearing bushing 26 on the outer end of an arm, as 27 or 28, and a set screw or bolt 29.

The inner ends of these radial arms 27 and 28 are inserted in sleeves 30, or tubular bosses, and fixed therein by set bolts or screws 31, and these tubular bosses are integral with a bearing sleeve 32 that surrounds the lower portion of the tubular post or column, and rests upon a bearing collar 33 fixed to the column by set bolt 34. The bearing sleeve or bushing 32, which is rotatably journaled on the tubular post or column, is cast with an integral, horizontally disposed gear 35 having beveled teeth, and the gear is revolved by means of an upright bevel pinion 36 that is fixed to revolve with a rotary operating shaft 37. The inner end of the operating shaft is journaled in a bearing bushing 38 of a collar 39 that is adjustable on the column or center post, and fixed in adjusted position by a set bolt 40, above the horizontally disposed bevel gear.

The outer end of the operating shaft, which is journaled in a sealed bearing 41 mounted on the side wall of the tank, and the shaft is equipped with an exterior crank handle 42 for use in manually turning the operating shaft and thereby transmitting power through the gearing to the brushes or scrapers. In this manner the sediment is conveyed to the discharge trough and outlet pipe, where it may be disposed of by gravity through the drain pipe, or by use of the pump after the circulating valves are properly adjusted for this purpose.

In this embodiment of the invention the rotary conveyor is designed to convey the sediment to the trough with one complete revolution, and in order to stop the rotation of the arms 27 or 28 at a desired point or angle to permit insertion of a gauging rod or stick, without interfering with the appliance. For this purpose an angular stop bar or rod 43 is hinged at 44 on a bracket 45 mounted on and having a bearing for the operating shaft, and the bracket is supported from the tubular post by an arm 46 having a collar 47 on the post, and secured thereto by set bolt or nut 48. The stop bar, pivotally suspended in the path of a brush arm, is contacted by the arm to indicate to the operator the desired stopping point for the appliance.

Having thus fully described my invention, what I claim as new and desire to secure by Letters Patent is:

1. In a tank cleaner and oil treater as described, the combination with a tank having a bottom outlet trough, a central tubular column mounted in the tank having an outlet port, and a fluid pressure operating system for circulating oil through the column, the tank and the trough, of a rotary conveyor mounted on the column and operating means therefor, said means including a sleeve mounted for rotation on said column, a bevelled gear on said sleeve, a manually operated crank handle extending outwardly of said tank and a gear on said crank handle adapted to mesh with the gear on said sleeve whereby the rotation of said crank handle will rotate said conveyor, and means carried by the conveyor for conveying sediment from the central portion of the tank into the outlet trough.

2. The invention as in claim 1 wherein a pump is located in the fluid pressure operating system, and a heating appliance for circulating oil located between the outlet of the pump and said column.

3. In the tank cleaner and oil treater described, the combination with a tank having a radially arranged bottom outlet trough, and a central tubular column mounted in the tank and having an outlet port within the tank, of a fluid pressure circulating system including the tank, the column and the trough, and means for heating the circulating fluid; a rotary conveyor mounted on the column and exterior operating means therefor, said means including a sleeve mounted for rotation on said column, a bevelled gear on said sleeve, a manually operated crank handle extending outwardly of said tank and a gear on said crank handle adapted to mesh with the gear on said sleeve whereby the rotation of said crank handle will rotate said conveyor, and means carried by the conveyor for sweeping sediment from the central portion of the tank to said trough.

WILLIS W. PHILLIPS.

REFERENCES CITED

The following references are of record in the file of this patent:

UNITED STATES PATENTS

| Number | Name | Date |
|---|---|---|
| 503,577 | Burnham | Aug. 22, 1893 |
| 1,478,222 | Hansen | Dec. 18, 1923 |
| 1,947,851 | Jewett | Feb. 20, 1934 |
| 2,263,790 | Vermillion | Nov. 25, 1941 |
| 2,277,210 | Lindsey | Mar. 24, 1942 |

FOREIGN PATENTS

| Number | Country | Date |
|---|---|---|
| 332,924 | Germany | Feb. 11, 1921 |
| 564,068 | Germany | Nov. 12, 1932 |